United States Patent Office
3,041,334
Patented June 26, 1962

3,041,334
1-[3-(5-NITRO-2-FURYL)-2-PROPEN-1-YLIDENE-AMINO]-2-IMIDAZOLIDINETHIONE
George M. Klein, Norwich, N.Y., assignor to The Norwich Pharmacal Company, Norwich, N.Y., a corporation of New York
No Drawing. Filed Oct. 23, 1959, Ser. No. 848,194
1 Claim. (Cl. 260—240)

This invention relates to a new chemical compound, 1-[3-(5-nitro-2-furyl)-2-propen-1-ylideneamino]-2-imidazolidinethione, represented by the formula:

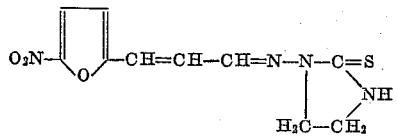

I have discovered that this new compound is possessed of antibacterial activity against a wide range of bacteria including *Escherichia coli*, *Salmonella typhosa*, *Streptococcus pyogenes*, *Streptococcus agalactiae*, *Staphylococcus aureus* and *Erysipelothrix rhusiopathiae*. It is a particular feature of this new compound that it exhibits a surprisingly high order of chemotherapeutic activity in combatting helminthic infections in animals when administered in far less than toxic amounts. It has achieved an astonishing chemotherapeutic success in the treatment of animals heavily infected with helminths such as *Syphacia obvelata* and *Ascaridia galli*. The former parasite is the causative agent of pinworm infection in mice and is representative of the variety of pinworm organisms including *Enterobius vermicularis* which is provocative of helminthic infection in human beings and whose sensitivity to oxyuracidal agents is substantially the same. The latter parasite is the causative agent of a commonly encountered found worm disease in poultry leading to impairment of growth and bone development and oftentimes death.

My new compound has been found to be effective when administered orally b.i.d. for four days to mice heavily infected with *Syphacia obvelata*, as shown by the results set forth in the following table:

| | Dose in mg./kg. | Pos./Total | Percent |
|---|---|---|---|
| Compound | 300 | 0/10 | 0 |
| Do | 100 | 0/10 | 0 |
| Do | 50 | 0/10 | 0 |
| Control | | 10/10 | 100 |

My new compound is surprisingly effective in the prophylaxis of *Ascaridia galli* infection of chickens. It has been administered in the diet of chickens at a concentration as low as 0.01% by weight for two days prior to the introduction of the infectious agent in the form of embryonated *Ascaridia galli* eggs by gavage; and the medicated diet was continued for a period of about forty one days. The birds were then sacrificed, autopsied and examined for worms. A remarkable reduction in size and number of worms was obtained in those birds which had received the medicated diet, as contrasted to infected, unmedicated birds, as shown in the following table:

| | Conc. in Diet (Percent by Weight) | No. of Birds | Days Treated | Day of Autopsy | Infected Total | No. of Worms found | Average Size of Worm (in cm.) | |
|---|---|---|---|---|---|---|---|---|
| | | | | | | | Male | Female |
| Compound | 0.02 | 11 | −2 to 41 | 43 | 1/11 | 1 | ----- | 2.5 |
| Do | 0.01 | 10 | −2 to 41 | 43 | 5/10 | 10 | 3.6 | 4.5 |
| Control | | 10 | | 40 | 10/10 | 98 | 5.1 | 6.7 |
| Do | | 10 | | 42 | 10/10 | 92 | 5.7 | 7.1 |

My new compound is relatively non-toxic. A dose of 2200 mg./kg. is tolerated by mice without ill effect. In the therapy of worm diseases of poultry, a diet containing 0.02% by weight of my new compound manifests no signs of toxicity.

My new chemotherapeutic agent is readily prepared by condensing 3-amino-2-imidazolidinethione with 3-(5-nitro-2-furyl) acrolein. It can be easily formulated in accordance with accepted practice in the form of tables, suspensions, elixirs, and the like in conjunction with compatible carriers and adjuvants.

In order that my invention may be readily available to those skilled in the art a method for preparing it is briefly described.

EXAMPLE

*1-[3-(Nitro-2-Furyl)-2-Propenylideneamino]-2-Imidazolidinethione*

(A) To a mixture of 1100 cc. of 2 N sulfuric acid and 400 cc. of dioxane is added 40.7 g. of ethylene thiourea. During about 1 hour, a solution of 27.5 g. of sodium nitrite dissolved in 100 cc. of water is added at 0–2°. After ½ hour stirring at 0°, 60 g. of zinc dust is added over a period of 20 minutes to maintain the temperature at about 10°. After 10 minutes additional stirring, the excess zinc is filtered off.

(B) A solution of 59 g. of 3-(5-nitro-2-furyl) acrolein dissolved in 700 cc. of hot acetic acid is treated with 11 g. of activated charcoal and filtered. The 3-(5-nitro-2-furyl) acrolein solution is added to the solution of A during about ½ hour with stirring. After 1 hour further stirring, the product is collected, washed with water, isopropanol, and ether and dried at 60°. The yield of orange microcrystalline material, M.P. 255° (incomplete) is 44 g. (47%). A solution of 44 g. of that material in 1000 cc. of dimethylformamide at 80° is treated with 7.5 g. activated charcoal and filtered. After adding 1200 cc. of water and cooling, a solid is deposited which is collected, washed with water, isopropanol, and ether, and dried overnight at room temperature and further dried for 1 hour at 110°. The yield of product, 1-[3-(5-nitro-2-furyl)-2-propenylideneamino]-2-imidazolidinethione, is 33 g., M.P. 265–266°.

What I claim is:
The chemical compound, 1-[3-(5-nitro-2-furyl)-2-propenylidene-amino]-2-imidazolidinethione, represented by the formula
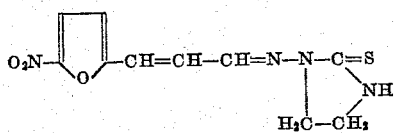
References Cited in the file of this patent
UNITED STATES PATENTS
| | | |
|---|---|---|
| 2,746,960 | Gever et al. | May 22, 1956 |
| 2,759,932 | Ebetino et al. | Aug. 21, 1956 |
| 2,920,074 | Michels | Jan. 5, 1960 |
FOREIGN PATENTS
| | | |
|---|---|---|
| 759,378 | Great Britain | Oct. 17, 1956 |
OTHER REFERENCES
Chemical Abstract, vol. 52, cols. 20,388 to 20,389 (1958) [abstract of Toda et al., Chemotherapy, vol. 6, pp. 91–5 (1958)].